United States Patent
Young

[15] 3,644,200
[45] Feb. 22, 1972

[54] AMMONIATED ZEOLITE CATALYSTS

[72] Inventor: Dean Arthur Young, Yorba Linda, Calif.
[73] Assignee: Union Oil Company of California, Los Angeles, Calif.
[22] Filed: Dec. 23, 1968
[21] Appl. No.: 786,437

[52] U.S. Cl..............................208/120, 23/111, 23/182, 208/111, 208/138, 208/217, 252/438, 252/455 Z, 260/668 A, 260/669 R, 260/673.5, 260/672 R, 260/680 R, 260/683.3, 260/683.44
[51] Int. Cl.................B01j 11/40, C10g 13/02, C10g 23/00
[58] Field of Search...................208/111, 89, 120, 138, 139, 208/217; 252/438, 455; 260/669, 672, 683.3, 680, 683.44; 23/111–113, 182

[56] References Cited

UNITED STATES PATENTS

| | | | |
|---|---|---|---|
| 3,404,086 | 10/1968 | Plank et al. | 208/120 |
| 3,404,085 | 10/1968 | Hamner et al. | 208/111 |
| 3,239,471 | 3/1966 | Chin et al. | 252/455 |
| 3,344,086 | 9/1967 | Cramer et al. | 252/452 |
| 3,523,887 | 8/1970 | Hanson et al. | 208/111 |
| 3,541,027 | 11/1970 | Lapides | 252/455 |

OTHER PUBLICATIONS

Kerr & Shipman "The Reaction of Hydrogen Zeolite Y with Ammonia at Elevated Temperatures" J. Phys. Chem. 72 (8) 3071–2 (Aug. 1968)

*Primary Examiner*—Delbert E. Gantz
*Assistant Examiner*—G. E. Schmitkons
*Attorney*—Milton W. Lee, Richard C. Hartman, Lannas S. Henderson, Dean Sandford, Robert E. Strauss and Michael H. Laird

[57] ABSTRACT

A new class of aluminosilicate zeolite catalysts is described, comprising a crystalline aluminosilicate zeolite modified by the incorporation therein of ammonia in nonzeolitic form. They are prepared by ammoniating the parent aluminosilicate at temperatures above about 350° C., with resultant displacement of water from the zeolite structure ("dehydroammoniation"). The ammonia is believed to be incorporated into the zeolite structure in the form of amide and/or imide groups bonded to silicon and/or aluminum atoms. The resulting compositions are found to display an unique selectivity for catalyzing carbonium ion reactions in hydrocarbon conversions, while competing free radical reactions (leading typically to polymerization and coke formation) are suppressed.

24 Claims, No Drawings

AMMONIATED ZEOLITE CATALYSTS

BACKGROUND AND SUMMARY OF INVENTION

The crystalline aluminosilicate zeolites, particularly the class known as molecular sieves, when converted to certain hydrogen and/or polyvalent metal forms, have recently been discovered to be a highly active class of catalysts for a great variety of hydrocarbon conversions, including cracking, hydrocracking, isomerization, alkylation, reforming and the like. These crystalline zeolite catalysts, used alone or with added catalytic metals such as nickel or palladium, are many times as active as the more conventional conversion catalysts based on amorphous supports such as alumina, silica-alumina or the like.

Despite their much higher overall activity, the crystalline zeolite catalysts display in varying degrees certain disadvantageous characteristics common to the conventional amorphous type catalysts. It has long been known that conventional acidic cogel catalysts, e.g., of the silica-alumina cracking type, contain at least two different types of active sites. The active sites which are desirable for most hydrocarbon conversions are protonic acidity sites which are believed to catalyze carbonium-ion-type reactions, while the undesirable sites are believed to consist of electron-deficient, or Lewis acid, sites which promote the formation of free radicals leading to polymerization and coke formation (Gould, "Mechanism and Structure in Organic Chemistry," page 730, Holt, Rinehart and Winston, 1959). The presence of these electron deficient sites with attendant free radical formation in the case of crystalline zeolite Y has been indicated by the electron spin resonance measurements of Stamires and Turkevich, J.A.C.S. 86, 749, 759 (1964). Coke formation is hence a problem common to the use of both the crystalline zeolite and the conventional amorphous catalysts.

The conventional approach to solving the coking problem when using amorphous or crystalline-zeolite-type catalysts, has been to attempt to hydrogenate and crack unsaturated coke precursors and polymers as soon as they are formed in the reaction zone. This is ordinarily accomplished by incorporating a hydrogenating metal into the catalyst base, and operating at relatively high hydrogen pressures. While this solution is effective in varying degrees, it is inconsistent with the basic desired reaction mechanism in some conversions such as cracking, dehydrogenation, dehydrocyclization, dealkylation, and the like. In catalytic reforming, moderate hydrogen pressures of about 500 p.s.i.g. are utilized to promote isomerization reactions and to reduce coking, but the main desired reaction, dehydrogenation of naphthenes to aromatics, is unfavorably affected by the hydrogen pressure.

In catalytic hydrocracking, some partial hydrogenation of polycyclic aromatic hydrocarbons is desirable in order to facilitate cracking, but complete hydrogenation of all aromatics is undesirable because it leads to a low-octane gasoline product. It would hence be desirable in hydrocracking processes to reduce the hydrogen partial pressure so as to avoid complete hydrogenation, an objective which has heretofore been difficult to achieve while still avoiding coke buildup on the catalyst. In isomerization reactions, some hydrogen is desirable to facilitate the reaction, but adequate repression of coke formation generally requires higher hydrogen partial pressures than are necessary for the reaction. In all of these cases it may be said in summary that it would be desirable to eliminate hydrogen, or at least reduce the necessary partial pressure thereof, if this could be done consistently with the prevention of coke formation. Achieving this desirable objective is one of the principal objects of the present invention.

It will be apparent from the foregoing, that the conventional prior art approach to catalyst deactivation by coking has been to attempt to reverse in midstream the chain of coke-forming reactions; not to prevent them at their inception. This has led to the common difficulty noted above of having to maintain higher hydrogen partial pressures in the reaction zone than would be desirable for the particular reactions concerned. The present invention takes the more desirable approach of preventing at inception the free radical formation which initiates the coke-forming chain of reactions. This is accomplished by essentially converting the electron-deficient Lewis acid sites on the zeolite catalysts to conjugate protonic acids centers which catalyze the desired carbonium ion initiated reactions. In addition to reducing the required hydrogen partial pressures, this approach also reduces the undesired formation of light hydrocarbon gases such as methane, which commonly accompanies coke-forming reactions. The overall improved results of the present invention are thus, increased catalyst life at reduced hydrogen partial pressures, reduced light gas make, improved selectivity for the desired reactions, and in many cases improved product quality where unsaturated and/or aromatic products are desired, as in the case of reforming, cracking, hydrocracking, dehydrocyclization, dealkylation, dehydrogenation, and the like.

According to my invention, the crystalline zeolite catalysts are dehydroammoniated at relatively high temperatures of e.g., 350°–800° C. At these high temperatures, it is found that ammonia is incorporated into the crystal lattice structure in a nonzeolitic form, with concomitant displacement of substantially molar equivalent amounts of water. This displacement of water from the crystal structure takes place even in the case of zeolites which have previously been dehydrated at high temperatures, and in the case of hydrogen and/or "decationized" zeolites. Although the exact chemical structure of the resulting dehydroammoniated zeolites is not known with certainty, infrared absorption studies indicate that amide and/or imide groups bonded to silicon and/or aluminum atoms are probably formed. For convenience, the resulting products are herein termed "amido zeolites", but it will be understood that this term is intended to apply to zeolites which have been dehydroammoniated at temperatures above about 350° C., regardless of the exact chemical structure thereof.

The amido zeolites are to be sharply distinguished from conventional ammonium zeolites. The latter contain basic nitrogen only in the form of zeolitic ammonium ions which are readily exchangeable from the zeolite structure, and which are readily decomposable at temperatures beginning at about 350° C. (with resultant formation of corresponding hydrogen zeolites). The amido zeolites are much more stable thermally, and the basic nitrogen therein is nonionic and essentially nonexchangeable with other cations, but is hydrolyzable therefrom. The amido zeolites are relatively stable up to temperatures of about 500° C., but substantial dissociation of ammonia may begin to appear at higher temperatures. Consequently, where the amido zeolites are to be employed at temperatures above about 500° C., it is preferable to maintain in the reaction zone a sufficient partial pressure of ammonia to repress dissociation. The dissociation is accelerated by the presence of water vapor, and hence where water is present in the reaction zone it may be desirable to maintain a substantial ammonia partial pressure even at temperatures below 500° C.

A surprising aspect of the invention is that while the amido zeolites retain a substantial desirable activity for promoting carbonium-ion-type reactions, a similar ammoniation of conventional acidic-cogel-type catalysts almost completely destroys all catalytic activity. The invention is hence critical to the use of crystalline zeolites. The term "crystalline" is employed herein to designate an ordered structure capable of being detected by electro-optical diffraction techniques, normally by X-ray diffraction, giving a consistent crystallographic pattern. Such an ordered structure can persist even after some of the structural silica or alumina is removed from the crystal lattice, as by leaching with acids or alkalis, or by other physical or chemical methods. Sometimes the ordered structure may become so attenuated by these or other means as to fail to diffract X-rays, but in such cases other electro-optical methods, such as electron beam diffraction may be utilized.

DESCRIPTION OF ZEOLITES

The crystalline zeolites for use herein belong principally to the class commonly referred to in the art as molecular sieves. They are composed essentially of alternating tetrahedra of silica and alumina arranged in an anionic crystalline network, combined with exchangeable cations such as sodium, hydrogen, magnesium, calcium, etc. They are further characterized by crystal pores of relatively uniform diameter between about 4 and 14 A. It is preferred in a large number of catalytic processes to employ zeolites having a relatively high $SiO_2/Al_2O_3$ mole-ratio, between about 3 and 12, and even more preferably between about 4 and 8. These silica-rich zeolites are unique in that they can be converted to highly acidic, stable hydrogen forms which are particularly useful in acid catalyzed reactions such as cracking, hydrocracking, isomerization, and the like.

Suitable zeolites found in nature include for example mordenite, stilbite, heulandite, ferrierite, dachiardite, chabazite, erionite, and faujasite. Suitable synthetic zeolites include for example those of the A, Y, L, B, R, S, T, Z and F crystal types, or synthetic forms of the natural zeolites noted above, especially synthetic mordenite. The preferred zeolites for most applications are those having relatively large crystal pore diameters between about 8–12 A, such for example as Y molecular sieve.

The naturally occuring zeolites are usually found in a sodium form, an alkaline earth metal form, or mixed forms. The synthetic zeolites normally are prepared first in the sodium form. For use as a cracking base, or in other acid catalyzed reactions, it is preferred that most or all of the original zeolitic alkali metal ions be exchanged out with a polyvalent metal, or with an ammonium salt followed by heating to decompose the zeolitic ammonium ions, leaving in their place hydrogen ions. Further heating of such hydrogen zeolites results in further water removal with resultant production of a "decationized" zeolite, which may also be utilized herein. In some cases, as in the case of synthetic mordenite, the hydrogen form can be prepared by direct acid treatment of the alkali metal zeolites. Hydrogen or decationized Y zeolites are described more particularly in U.S. Pat. No. 3,130,006.

In catalytic reactions where cracking is undesired, as for example in isomerization, reforming, dehydrogenation, desulfurization, denitrogenation, and the like, it may be desirable to reduce the acidity of the zeolite. This is ordinarily accomplished by employing alkali metal and/or alkaline earth metal forms of such zeolites.

The polyvalent metal zeolites are generally of intermediate acidity between alkali metal zeolites and hydrogen zeolites. Suitable polyvalent metal cations include particularly those of Groups IIA, IIB, VIIB and VIII of the periodic table, and the rare earth metals. Specifically desirable polyvalent metal cations include for example magnesium, calcium, strontium, zinc, cadmium, manganese, iron, cobalt, nickel, palladium, platinum, cerium, lanthanum, praseodymium, neodymium, illinium, samarium, gadolinium, europium, terbium, dysprosium, holmium, erbium, thulium, scandium, yttrium and lutecium. These polyvalent metal zeolites are particularly useful in reactions where moderate acidity is desired, as for example reforming, denitrogenation, dealkylation, and the like. It should be noted however that the rare earth zeolites display a generally higher cracking activity than most of the other polyvalent metal zeolites.

Mixed polyvalent metal-hydrogen zeolites may also be employed advantageously in many reactions. These mixed cation zeolites are preferably prepared by first ion exchanging with an ammonium salt, then partially back exchanging with a polyvalent metal salt, and then calcining. Preferred catalyst compositions for cracking and hydrocracking reactions are those wherein at least 10 percent, and preferably at least 20 percent of the original ion exchange sites are converted to hydrogen ion sites. A specifically desirable and stable class of zeolites are those wherein at least about 20 percent of the ion exchange capacity is satisfied by hydrogen ions, and at least about 10 percent by polyvalent metal ions such as magnesium, calcium, zinc, chromium, rare earth metals, etc.

In order to utilize the foregoing zeolites in reactions wherein a definite hydrogenation and/or dehydrogenation function is desired, a hydrogenating metal promoter is employed, normally a Group VIB and/or Group VIII metal, including the noble metals. The preferred hydrogenating metals comprise palladium, platinum, cobalt, nickel, molybdenum, and tungsten. Chromium and manganese may also be employed. The amount of hydrogenating metal in the catalyst may vary within wide ranges. Broadly speaking any amount between about 0.01 percent to about 30 percent by weight may be employed. In the case of the noble metals, it is normally preferred to use about 0.1 percent to 2 percent by weight. The preferred method of adding the hydrogenating metal is by ion exchange. This is accomplished by digesting the zeolite, preferably in its ammonium form, and prior to the high temperature ammoniation treatment, with an aqueous solution of a suitable compound of the desired metal wherein the metal is present in a cationic form, as described for example in U.S. Pat. No. 3,236,762. The resulting metal-ammonium zeolite may then be subjected to calcining and ammoniation as hereinafter described.

DEHYDROAMMONIATION PROCEDURES

To accomplish the desired dehydroammoniation, the zeolite in any desired cationic form is heated in an atmosphere consisting essentially of, or at least comprising a substantial partial pressure of, ammonia, at temperatures ranging between about 350° and 800° C., preferably between about 450° and 700° C. The partial pressure of ammonia should be maintained at a level above about 0.1 p.s.i.a., and preferably above about 5 p.s.i.a., ranging up to any desired superatmospheric pressure. Superatmospheric pressures normally are undesirable however in that they inhibit the removal of water which is displaced in substantial quantities from the zeolite structure. To accelerate the displacement of water, it is normally desirable to pass a flowing stream of gas comprising ammonia through the ammoniation zone. Substantial ammoniation can take place in times as short as 10 minutes, especially at higher temperatures, but normally the ammoniation requires from about 20 minutes up to about 3 hours, depending upon temperature and desired degree of ammoniation. It is not essential to drive the dehydroammoniation reaction to completion in all cases, since any degree of ammoniation is found to benefit the catalyst to some extent. Different zeolites vary substantially in the rate and quantity of uptake of ammonia under these conditions. Normally from about 0.5 up to about 5 weight percent of nitrogen may be absorbed, but amounts as little as 0.1 weight percent or even less will in many cases be sufficient to give a measurable improvement in catalytic selectivity.

The ammoniating atmosphere preferably consists essentially of ammonia gas, but other relatively inert diluent or carrier gases may be included such as nitrogen, hydrogen, and the like. Hydrocarbons, especially aromatic hydrocarbons, interfere with the desired ammoniation, and are hence preferably absent during the ammoniation treatment. Although water vapor tends to reverse the high temperature ammoniation reaction, its presence is not to be excluded if the partial pressure of ammonia is sufficiently high. In some cases in fact it has been observed that the presence of water vapor tends to improve catalytic activity and stability.

In most cases, it is preferred to convert the zeolite to an ammonium form, a hydrogen form and/or a decationized form prior to ammoniation. Maximum benefits from the dehydroammoniation treatment appear to be obtained in those cases where the ultimate catalysts after calcining will contain hydrogen and/or decationized exchange sites. Zeolites in their 100 percent metallic forms normally contain a minimum of such potentially electron-deficient sites, and for this reason are not benefited by the dehydroammoniation to the same extent as the hydrogen and/or decationized zeolites.

Certain hydrogen zeolites, particularly those wherein the $SiO_2/Al_2O_3$ mole ratio is about 3 to 5, e.g. Y zeolite, tend to be hydrothermally unstable in that their crystal structure is destroyed by contact with steam at elevated temperatures. By subjecting such zeolites, in their ammonium and/or hydrogen forms, to dehydroammoniation at temperatures between about 500° and 950° C., it is found that products of much greater hydrothermal stability are obtained.

In the case of zeolite catalysts containing a hydrogenating metal, it is conventional to activate such catalysts by a hydrogen reduction step, followed if desired by a sulfiding step. The dehydroammoniation step may be performed prior to these activation treatments, but preferably is performed during or after such treatments.

USE OF CATALYSTS

The catalysts of this invention may be employed in a wide variety of hydrocarbon conversion and refining processes, herein termed hydrocarbon "upgrading" processes. The common feature in all of such processes involves contacting the feedstock with the desired catalysts at an elevated temperature ranging between about 400° F. to about 1200° F. Any conventional contacting technique may be employed, including fixed bed, moving bed, fluidized bed and slurry contacting procedures. Normally a fixed bed operation is preferred, with the feed being passed in vapor phase, liquid phase, or mixed phase through a bed of macro pellets of catalyst. In order to maintain the catalyst in an optimum ammoniated state, it is preferred to include with the feed sufficient added ammonia or ammonia-yielding compounds to maintain an ammonia partial pressure in the contacting zone of at least about 0.1 p.s.i.a., preferably between about 5 and 50 p.s.i.a. This addition of ammonia is especially desirable in cases where the feed contains heavy asphaltic components (crude oils and the like), and in those cases where it is desired to minimize cracking reactions, as e.g. where the catalyst is a highly acidic hydrogen and/or polyvalent metal zeolite and is being used in a process such as isomerization or dehydrogenation in which cracking is undesired.

Catalytic cracking operations are preferably carried out at temperatures of 850°–1,100° F., space velocities of 0.5 to 10 volumes of liquid feed per volume of catalyst per hour, and at pressures of 0–50 p.s.i.g. Preferred feedstocks include gas oils and heavy naphthas, deasphalted crude oil residua, etc, with gasoline being the principal desired product. Preferred catalysts for catalytic cracking comprise hydrogen and/or polyvalent metal zeolites having silica/alumina mole ratios between about 3.0 and 12, which have been dehydroammoniated to a nitrogen content of e.g., about 1–3 weight percent. If desired the crystalline zeolite may be incorporated into a matrix of silica-alumina cogel.

Dehydrocyclization reactions are carried out under substantially the same conditions as those indicated above for catalytic cracking, employing as primary feedstocks paraffin hydrocarbons, preferably normal paraffins, having at least six carbon atoms, e.g. n-hexane, n-heptane, n-octane and the like, the corresponding products comprising mainly benzene, toluene, xylenes and the like. Preferred dehydrocyclization catalysts comprise zeolites wherein the ion exchange capacity is satisfied mainly by metals of Group IIA and/or IIB, e.g., magnesium, calcium, strontium, zinc and the like. Manganese, iron, cobalt and nickel zeolites may also be employed. In all cases it is preferred to incorporate between about 0.1 percent and 20 percent by weight of one or more hydrogenating metals into the catalyst, preferably the metals of Groups VIB and/or VIII e.g., nickel, palladium, platinum, molybdenum, etc. The final catalyst is dehydroammoniated to a nitrogen content of e.g., 0.5–3 weight percent.

Dehydrogenation reactions are carried out under the same general conditions described above for catalytic cracking, and the preferred catalysts are similar to those described above for dehydrocyclization reactions. Substantially any paraffinic or alkyl aromatic hydrocarbon may be dehydrogenated to corresponding unsaturated compounds. For example ethane may be converted to ethylene, propane to propylene, butane to butene, cyclohexane to benzene, methyl cyclohexane to toluene, ethylbenzene to styrene, etc.

Reforming operations are preferably carried out at temperatures of about 800°–1,000° F., hydrogen pressures ranging between about 100 and 400 p.s.i.g., and liquid hourly space velocities of about 0.5–5. Preferred feedstocks comprise straight run and/or cracked naphthas boiling in the range of about 200°–450° F., while the preferred catalysts comprise Group VIII noble metal-promoted zeolites wherein the ion exchange capacity is satisfied primarily by Group IIA and/or Group IIB metals, e.g., magnesium, calcium, strontium, zinc and the like. Hydrogen/oil ratios may range between about 500–10,000 SCF/B.

Isomerization reactions are carried out under conditions similar to those described above for reforming, using somewhat more acidic catalysts. Olefins are preferably isomerized at temperatures of 500°–900° F., while paraffins, naphthenes and alkyl aromatics are isomerized at temperatures of 700°–1,000° F. Particularly desirable isomerization reactions contemplated herein include the conversion of n-heptane and/or n-octane to iso-heptanes and iso-octanes, butane to iso-butane, methylcyclopentane to cyclohexane, meta-xylene and/or ortho-xylene to paraxylene, 1-butene to 2-butene and/or isobutene, n-hexene to isohexenes, cyclohexene to methylcyclopentene, etc. Preferred catalysts comprise the Group VIII noble metal promoted zeolites wherein the ion-exchange capacity is satisfied partly by polyvalent metals and partly by hydrogen ions, e.g., Y zeolite and/or mordenite, wherein about 50–60 percent of the ion exchange capacity is satisfied by Group IIB, Group IIA, rare earth metals or the like, and about 5–30 percent by hydrogen ions, the catalyst in any case being dehydroammoniated to a nitrogen content of about 0.5–3 weight percent.

In hydrocracking operations, the preferred catalysts comprise the same group of acid zeolites described above in connection with catalytic cracking, to which has been added about 0.1–20 weight percent of one or more hydrogenating metals, preferably metals of Groups VIB and/or Group VIII, e.g., nickel, palladium, platinum, molybdenum and the like. Preferred hydrocracking conditions include temperatures of about 600°–1,000° F., hydrogen pressures of about 300–1,000 p.s.i.g., space velocities of about 0.5–10, and hydrogen/oil ratios of about 500–10,000 SCF/B. Primary feedstocks include straight run and/or cracked gas oils, coker distillates, heavy naphthas and the like. Reduced crude oils, or crude oil residua may also be employed, preferably with excess added ammonia to further repress polymerization and coking. Hydrocracking temperatures are suitably adjusted so as to give the desired product, normally gasoline, but in many cases jet fuels, diesel fuels, or even propane-butane mixtures (LPG). It will be understood that the hydrogen pressures preferred herein for hydrocracking are substantially lower than those normally employed, the normal pressures ranging between about 1,000–3,000 p.s.i.g. As a result of the lower pressures, a substantially more aromatic heavy gasoline product is produced having a relatively high leaded octane number of e.g., 95–100.

In catalytic dealkylation, the objective is to effect scission of paraffinic side chains from aromatic rings, without substantially hydrogenating the ring structure. To accomplish this objective, relatively high temperatures in the range of about 800°–1,100° F. are employed at moderate hydrogen pressures of about 300–1,000 p.s.i.g., other conditions being similar to those described above for catalytic hydrocracking. Preferred catalysts are of the relatively nonacidic type described above in connection with catalytic dehydrocyclization. Particularly desirable dealkylation reactions contemplated herein include the conversion of methylnaphthalene to naphthalene and toluene and/or xylenes to benzene.

In catalytic hydrofining, the primary objective is to effect a selective hydrodecomposition of organic sulfur and/or nitrogen compounds in the feed, without substantially affecting hydrocarbon molecules therein. For this purpose it is preferred to employ the same general conditions described above for catalytic hydrocracking, and catalysts of the same general nature described in connection with dehydrocyclization operations. Primary feedstocks include gasoline fractions, kerosenes, jet fuel fractions, diesel fractions, light and heavy gas oils, deasphalted crude oil residua and the like, any of which may contain up to about 5 weight percent of sulfur and about 3 weight percent of nitrogen.

The following Examples are cited to illustrate specific catalysts of the present invention, and their utility in hydrocarbon conversions, but such examples are not to be construed as limiting in scope.

EXAMPLE I

This example demonstrates the differing effects of dehydroammoniation on crystalline zeolite catalysts, and on conventional silica-alumina cogel catalysts.

Catalyst A, a hydrogen Y zeolite, was prepared by calcining in air at 480° C. an ammonium Y zeolite having a $SiO_2/Al_2O_3$ mole ratio of about 4.8. The resulting hydrogen zeolite was free of ammonia and contained 0.8 weight percent $Na_2O$.

Catalyst B was a conventional 87 percent silica—13 percent alumina cogel cracking catalyst, which was likewise calcined at 480° C.

In test runs 3 and 4, 5 ml. samples of the respective catalysts A and B were placed in an isothermal reactor and heated to 454° C. in a flowing stream of hydrogen at atmospheric pressure. A hydrocarbon feedstock, decalin, was then metered at a constant rate into the influent hydrogen stream to provide a liquid hourly space velocity of 2.0. The decalin-hydrogen mixture was then passed through the catalyst beds for 54 minutes at 454° C., and the reactor product was collected in a liquid-gas separator kept at 0° C., the amount of liquid recovered in the separator thus being inversely proportional to cracking activity of the respective catalysts. (The hydrogen employed under these low pressure conditions is essentially inert, functioning merely as a carrier gas.)

In test runs 40 and 42, the procedure of runs 3 and 4 was essentially repeated except that before the introduction of decalin feedstock, each catalyst was dehydroammoniated for 30 minutes at 454° C., employing an ammoniation gas consisting of 90 percent ammonia and 10 percent hydrogen by volume. The decalin feedstock was then introduced into the ammonia-hydrogen gas stream and the cracking tests continued for 54 minutes as described above, with continuous flow of the ammoniation gas mixture through the catalyst beds. The results of the respective test runs were as follows:

TABLE 1

| Catalyst | A (Zeolite) | | B (Cogel) | |
| --- | --- | --- | --- | --- |
| Run No. | 4 | 42 | 3 | 40 |
| Dehydroammoniation | No | Yes | No | Yes |
| Wt-% of Feed Recovered as Liquid at 0° C. | 52 | 57 | 79 | 90 |
| Gasoline Fraction, Vol-% in liquid Product | | | | |
| Initial 20° C. | 1 | 1 | 2 | 0 |
| 40 | 2 | 2 | 3 | 0 |
| 60 | 3 | 6 | 4 | 1 |
| 80 | 9 | 10 | 8 | 1 |
| 100 | 14 | 14 | 11 | 2 |
| 120 | 22 | 18 | 15 | 2 |
| 140 | 28 | 23 | 17 | 2 |
| Used Catalyst | | | | |
| Color | Black | Lt. gray | Black | Lt. gray |
| Wt-% | 18.7 | 1 | 2.8 | 1 |

The foregoing data shows that the nonammoniated zeolite catalyst A was initially very active for cracking, but was rapidly deactivated by the deposition of coke. The dehydroammoniated zeolite catalyst on the other hand was almost completely free of coke while still retaining substantially all of the activity of the nonammoniated zeolite. These results are in sharp contrast to those obtained with cogel catalyst B; ammoniation similarly reduced coking of the catalyst, but at the same time substantially destroyed its cracking activity.

EXAMPLE II

Another zeolite catalyst C, a hydrogen mordenite, was prepared by calcining an ammonium ion-exchanged synthetic sodium mordenite ("Zeolon"—$SiO_2/Al_2O_3$ mole-ratio, 10) at 480° C. until deammoniation was substantially complete, giving a hydrogen mordenite product containing 0.1 weight percent $Na_2O$. This catalyst was then tested, with and without a 30 minute dehydroammoniation at 454° C., for the cracking of decalin as described in Example I. In the case of the nonammoniated catalyst, only about 12 weight percent of the feed was cracked to products not condensable at 0° C., while in the case of the dehydroammoniated catalyst about 21 percent of the feed was cracked. After the test runs, the nonammoniated catalyst was black in color and contained 5.1 weight percent carbon, while the dehydroammoniated catalyst was yellow-green in color and contained less than 1 weight percent carbon. Thus, in this case, the dehydroammoniated catalyst not only produced less coke than the nonammoniated, but was more active.

EXAMPLE III

Another hydrogen mordenite catalyst, D, was prepared by calcining a sample of the same ammonium mordenite employed in Example II at a temperature of 510° C. The resulting hydrogen mordenite was then tested for cracking activity using n-dodecane feed, with and without a 30 minute dehydroammoniation at 510° C. (using the 90 percent ammonia—10 percent hydrogen mixture employed in Examples I and II). The principal results were as follows:

TABLE 2

| Catalyst | D (H-mordenite) | | |
| --- | --- | --- | --- |
| Run No. | 48 | 49 | 50 |
| Dehydroammoniation | Yes | Yes | No |
| Cracking Temp., °C. | 454 | 505 | 505 |
| Wt-% of Feed recovered as liquid at 0° C. | 68.7 | 58.3 | 60.1 |
| Vol-% of liquid product boiling below 200° C. | 9.6 | 15.2 | 4.7 |
| Net gas production, moles/mole feed[a] | — | 0.83 | 0.30 |
| Mole-% methane in hydrocarbon make gas | 0.0 | 0.0 | 10.5 |
| Ratio Ethylene/ethane in make gas | 3.4 | 5.0 | 0.7 |

[a]Total hydrocarbon make gas noncondensable at 0° C. collected over 24–48 minutes of run period.

The data from runs 49 and 50 show that dehydroammoniation substantially increased the cracking activity of the catalyst, in that there was a greater production of hydrocarbon gases and material boiling below 200° C. The used catalyst from run 48 was white in color and that from run 49 was buff, both containing less than 1 weight percent carbon, while the catalyst from run 50 was black in color and strongly paramagnetic, indicating the presence of free radicals with unpaired electrons.

The much higher ratios of ethylene/ethane obtained with the ammoniated catalysts in runs 48 and 49 indicate superior dehydrogenation activity for the dehydroammoniated catalysts. It will also be noted that these catalysts produced substantially no methane, in distinction to the 10.5 mole percent produced by the nonammoniated catalyst, indicating poor selectivity of cracking. The used catalyst from run 49 was found by Kjeldahl analysis to contain 2.51 weight percent of nitrogen.

EXAMPLE IV

To show more graphically the relative deactivation rates of dehydroammoniated versus nonammoniated zeolite catalysts, three additional comparisons were made on gas production rates over 54 minute runs using the hydrogen mordenite catalyst of Example III, with and without dehydroammoniation, and with and without continuation of the ammonia flow during the cracking tests. The cracking was carried out in all cases at 505° C., 2.0 LHSV and atmospheric pressure, using n-dodecane feed. Analyses were also made of the liquid products, showing improved dehydrocyclization activity for the dehydroammoniated catalysts. The results were as follows:

TABLE 3

| Catalyst | D (Hydrogen mordenite) | | |
|---|---|---|---|
| Run No. | 50 | 66 | 67 |
| Dehydroammoniation | No | Yes[a] | Yes[a] |
| Influent gases during cracking, moles/mole feed | | | |
| Hydrogen | 4.8 | 0.70 | 5.2 |
| Ammonia | none | 4.5 | none |
| Net gas make rate, ml./sec. after minutes on stream | | | |
| 6 min. | 0.93 | 0.75 | 0.76 |
| 12 | 0.93 | 0.60 | 0.66 |
| 18 | 0.40 | 0.60 | 0.62 |
| 24 | 0.25 | 0.52 | 0.48 |
| 30 | 0.16 | 0.51 | 0.40 |
| 36 | 0.14 | 0.44 | 0.36 |
| 42 | 0.11 | 0.39 | 0.33 |
| 48 | 0.04 | 0.36 | 0.29 |
| 54 | nil | 0.32 | 0.26 |
| Wt-% of Feed recovered as liquid at 0° C. | 60.1 | 46.3 | 58.3 |
| Vol-% Aromatics in liquid product | | | |
| Total | 0.31 | 4.35 | 1.60 |
| Alkylbenzenes | 0.16 | 2.27 | 1.14 |

[a] Dehydroammoniation for 30 minutes at 510° C., in stream of 87% $NH_3$–13% $H_2$.

The above data shows that the nonammoniated catalyst in run 50 was initially more active than the dehydroammoniated catalyst, but after 54 minutes on stream had lost substantially all activity. Highest sustained activity was achieved in run 66 wherein ammonia was continuously passed through the reaction zone. In run 67 the slightly lower gas make at the end of the run indicated that in the absence of ammonia, some of the amide nitrogen was apparently being lost. However, Kjeldahl analyses of the used catalysts from runs 66 and 67 showed 2.25 and 2.72 weight percent of nitrogen, respectively, which apparently indicates that nitrogen was not lost in run 67, but merely transformed to a less active form. The superior dehydrocyclization activity of the catalysts in run 66 and 67 was readily apparent.

EXAMPLE V

The hydrogen Y zeolite catalyst A of Example I was tested with and without dehydroammoniation for the cracking of tetralin under the same dehydroammoniation and cracking conditions described in Example I. The net gas production rates over the 54 minute runs, and product olefin/paraffin ratios were as follows:

TABLE 4

| Catalyst | A (Hydrogen Y Zeolite) | |
|---|---|---|
| Run No. | 54 | 55 |
| Dehydroammoniation | Yes | No |
| Cracking Temp., °C. | 456 | 454 |
| Net Gas Make Rate, ml./sec. after minutes on stream | | |
| 10 min. | 0.3 | 0.48 |
| 20 | 0.29 | 0.35 |
| 30 | 0.28 | 0.29 |
| 40 | 0.29 | 0.27 |
| 50 | 0.23 | 0.20 |
| Olefin/Paraffin Mole ratios in make gas | | |
| $C_2$ | 2.0 | 1.2 |
| $C_3$ | 1.3 | 0.4 |
| $C_4$ | 0.5 | 0.04 |

Here again, the nonammoniated catalyst was initially much more active than the dehydroammoniated catalyst, but rapidly declined to a lower activity during the 54 minute run period. The dehydroammoniated catalyst produced throughout the run a much higher ratio of olefin/paraffin ratios, indicating superior dehydrogenation activity.

EXAMPLE VI

Another series of runs were carried out to test the effects of water vapor during dehydroammoniation and cracking, and the effect of dehydroammoniating hydrogen zeolites versus ammonium zeolites. The initial catalyst was the ammonium Y zeolite of Example I, and the feedstock was a hydrofined gas oil substantially free of sulfur and nitrogen, having a gravity of 34.9° API, and containing 29 volume percent aromatics, 1 percent olefins and 70 percent saturates, and boiling in the range of 200°–850° F. The cracking runs were carried out at 2.0 LHSV, and atmospheric pressure, the remaining conditions and results of the runs being as follows:

TABLE 5

| Initial Catalyst | Ammonium Zeolite Y | | | |
|---|---|---|---|---|
| Run No. | 73 | 57 | 76 | 72 |
| Precalcination at 480° C. | Yes | Yes | No | Yes |
| Dehydroammoniation at 480° C. | No | Yes | Yes | Yes |
| Influent Carrier gas during cracking, moles/mole feed | $H_2$-5.8 | $H_2$-0.68[a] $NH_3$-5.1 | $H_2$-0.69[a] $NH_3$-5.4 | $H_2$-0.71[a] $NH_3$-5.3 $H_2O$-0.09 |
| Cracking Temp., °C. | 456 | 455 | 456 | 454 |
| Av. net gas production, moles/mole feed | 0.66 | 1.12 | 1.00 | 1.04 |
| Wt-% Feed recovered as liquid at °C. | 80 | 83 | 50 | 52 |
| Vol-% of liquid product boiling below 200° C. | 12 | 22 | 39 | 41 |

[a] Same carrier gas used for dehydroammoniation.

The foregoing data shows that the nonammoniated catalyst in run 73 was again the least active for the production of light gases and gasoline boiling range material. A comparison of runs 57 and 76 shows that when the ammonium zeolite is subjected to dehydroammoniation without prior conversion to the hydrogen form (run 76) the resulting catalyst is apparently more active and selective for producing gasoline boiling range hydrocarbons. Run 72 shows that dehydroammoniation and cracking in the presence of water likewise improves selectivity for gasoline products. In these runs, as in the previous runs, the nonammoniated catalyst (run 73) was severely coked, while the dehydroammoniated catalysts (runs 57, 76 and 72) were light in color indicating substantially no coking.

The used catalysts from runs 76 and 72 were found by Kjeldahl analyses to contain 1.64 and 0.727 weight percent of nitrogen, respectively.

EXAMPLE VII

This example shows that dehydroammoniation markedly increases the resistance of the zeolite catalyst to deactivation by organic nitrogen compounds in the feed, and also that ammoniation in the presence of hydrocarbon feed is ineffective. The initial catalyst employed in all runs was the same zeolite Y catalyst A of Example I, and the feed was the same gas oil employed in Example VI, except that in runs 74 and 75 2 weight percent of nitrogen was added to the feed as monoamylamine. The tests were carried out at atmospheric pressure and 2.0 LHSV, the remaining conditions and results of the runs being as follows:

TABLE 6

| Initial Catalyst | A (Hydrogen Y Zeolite) | | |
|---|---|---|---|
| Run No. | 73 | 74 | 75 |
| Dehydroammoniation | No | No | Yes[a] |
| Nitrogen in Feed, Wt-% | nil | 2.0 | 2.0 |
| Cracking Temp., °C. | 456 | 456 | 454 |
| Wt-% of Feed recovered as liquid at 0° C. | 79.9 | 75.1 | 37.1 |
| Net Gas Make Rate, ml./sec. after minutes on stream | | | |
| 12 min. | 0.58 | 0.85 | 0.34 |
| 24 | 0.35 | 0.12 | 0.44 |
| 36 | 0.17 | 0.02 | 0.44 |
| 48 | 0.10 | 0.01 | 0.37 |
| 60 | 0.08 | 0.03 | 0.29 |
| 72 | 0.05 | 0.04 | 0.21 |
| 84 | 0.03 | 0.06 | 0.17 |
| 96 | 0.05 | 0.06 | 0.12 |
| 108 | 0.00 | 0.00 | — |
| Av. Gas Production, moles/mole feed | 0.56 | 0.40 | 0.90 |

[a]Ammoniated 30 minutes at 480° C. with 89% $NH_3$–11% $H_2$ gas stream, which was continued during cracking.

Comparing the rates of gas production shows that the nonammoniated catalyst required about 1 hour to lose its activity with the nitrogen-free feed. At 60 minutes on stream in run 73 the gas production was 14 percent of the 12 minute value. The presence of 2.0 weight percent nitrogen in run 74 greatly increased the deactivation rate of the nonammoniated zeolite; deactivation was substantially complete after 36 minutes on stream. The dehydroammoniated zeolite however deactivated at a much lower rate in run 75, and the average activity of the catalyst was over twice that of the nonammoniated catalyst. It is thus evident that dehydroammoniation markedly increases resistance of the zeolite catalyst to deactivation by organic nitrogen compounds. It is further evident from run 74 that effective dehydroammoniation is not obtained in the presence of hydrocarbon feed (even though the used catalyst from this run did contain 0.394 weight percent of nitrogen).

EXAMPLE VIII

To demonstrate the effect of dehydroammoniation on a zeolite catalyst containing a hydrogenating metal, two additional runs were carried out under cracking conditions using n-dodecane feed. The initial catalyst in both runs was a Y zeolite ($SiO_2/Al_2O_3$ mole ratio 4.8) wherein about 40 percent of the ion exchange capacity was satisfied by hydrogen ions, 50 percent by magnesium ions and 10 percent by residual sodium ions, into which about 0.5 weight percent of palladium was exchanged. This zeolite component was admixed with 20 weight percent of alumina containing 0.5 weight percent palladium. The conversion was carried out as previously described at 2.0 LHSV and atmospheric pressure. The principal results were as follows:

TABLE 7

| Catalyst | E (Pd—Mg—H Zeolite Y) | |
|---|---|---|
| Run No. | 52 | 53 |
| Dehydroammoniation | Yes | No |
| Cracking Temp., °C. | 456 | 454 |
| Influent gas/feed mole ratio | $NH_3$-5.16[a] $H_2$-0.64 | $H_2$-4.7 |
| Net gas make after minutes on stream, moles/mole feed | | |
| 5 min. | 1.26 | 3.6 |
| 50 min. | 0.77 | 1.1 |
| Composition of hydrocarbon make-gas mole-% | | |
| Methane | 0.0 | 34.8 |
| $C_2$-$C_5$ | 98.0 | 65.1 |
| Olefin/paraffin ratios in gas | | |
| $C_2$ | 1.7 | 0.13 |
| $C_3$ | 4.7 | 0.15 |
| $C_4$ | 2.6 | 0.39 |
| Total conversion, vol-% of feed | | |
| To $C_5$-$C_{12}$ olefins | 3.36 | 1.17 |
| To $C_9$-$C_{12}$ alkylbenzenes | 1.12 | 0.52 |
| To carbon[b] | 3.4 | 7.1 |

[a]Same gas mixture used for dehydroammoniation at 480° C.
[b]Weight-percent.

It will be noted that at 5 minutes on stream, the nonammoniated catalyst was almost three times as active as the dehydroammoniated catalyst, but that after 50 minutes the respective activities were very similar, reflecting rapid deactivation of the nonammoniated catalyst. This is also confirmed by the high carbon content of the used catalyst from run 53. The nonammoniated catalyst again produced larger amounts of methane, and was thus much less selective in cracking activity than the dehydroammoniated catalyst, which produced no methane. The much higher olefin/paraffin ratios produced by the dehydroammoniated catalyst again show a higher dehydrogenation activity. Also, the dehydroammoniated catalyst produced a much larger proportion of $C_9$-$C_{12}$ alkylbenzenes, demonstrating a superior dehydrocyclization and reforming activity.

EXAMPLE IX

Two additional runs were carried out to demonstrate the effect of dehydroammoniation on hydrocracking activity of metal-promoted zeolite catalysts. The feedstock was a straight run gas oil boiling between 455°–890° F., containing 1.05 weight percent sulfur and 0.233 percent nitrogen. The catalyst was a magnesium zeolite Y containing 6.1 weight percent zeolitic nickel as NiO, and 8.7 percent of molybdenum oxide, composited with about 20 weight percent of a 35 percent clay—65 percent silica binder. The pelleted composite was tested at 2.0 LHSV, 1400 p.s.i.g. and 12,000 SCF of hydrogen per barrel of feed. In each of the test runs the catalyst was precalcined and sulfided, and in run 324 was then dehydroammoniated. The hydrocracking runs were conducted in the absence of additional ammonia. The principal results were as follows:

TABLE 8

| Catalyst | F | (Ni-Mo-Mg Zeolite Y) | |
|---|---|---|---|
| Run No. | | 316 | 324 |
| Dehydroammoniation | | No | Yes[a] |
| Conversion Temp., °F. | | 811 | 799 |
| Liquid Recovery, vol-% of feed | | 96.4 | 99.0 |
| Conversion to 455° F. end point products, vol-% of feed | | 26.9 | 26.2 |

[a]Dehydroammoniated with 1/1 hydrogen-ammonia mixture for 1 hour at 400° and 1 hour at 900° F.

The above data show that the dehydroammoniated catalyst gave essentially the same overall conversion to gasoline as did the nonammoniated catalyst, but at a temperature 12° F. lower. This 12° temperature difference corresponds to about a 50 percent improvement in activity of the catalyst. Moreover, it will be noted that the dehydroammoniated catalyst was more selective for producing the desired liquid hydrocarbons.

The following claims are believed to define the true scope of the invention, which is not limited to the exemplary details described above:

I claim:

1. A crystalline alumino-silicate zeolite containing at least about 0.1 weight percent of basic, nonzeolitic nitrogen added thereto by ammoniation at a temperature between about 350° and 800° C. in an atmosphere substantially free of aromatic hydrocarbons and comprising a partial pressure of ammonia sufficient to effect chemical combination thereof with said zeolite with resultant displacement of water therefrom.

2. A composition as defined in claim 1 wherein said zeolite has a $SiO_2/Al_2O_3$ mole ratio of at least about 3.0.

3. A composition as defined in claim 1 wherein said zeolite is a Y molecular sieve.

4. A composition as defined in claim 1 wherein said zeolite is mordenite.

5. A composition as defined in claim 1 wherein said zeolite is partially or completely in a hydrogen form, an ammonium form, or a decationized form when subjected to said ammoniation.

6. A composition as defined in claim 1 wherein said ammoniation is carried out in the presence of water vapor.

7. A composition as defined in claim 1 containing in addition a minor proportion of a hydrogenating component selected from the class consisting of the Group VI-B and Group VIII metals, and their oxides and sulfides.

8. A composition as defined in claim 1 wherein said ammoniation is carried out at a temperature between about 450° and 700° C.

9. In a catalytic contacting process wherein a hydrocarbon feedstock is contacted with a crystalline aluminosilicate zeolite catalyst at elevated temperatures to effect a conversion and/or hydrofining of said feedstock and wherein the contacting conditions are of such severity that substantial quantities of unwanted coke and light hydrocarbon gases are normally produced, the improved method for reducing said production of coke and light hydrocarbon gases, which comprises utilizing as the catalyst in said contacting process a composition comprising a crystalline aluminosilicate zeolite containing at least about 0.1 weight percent of basic, nonzeolitic nitrogen added thereto by ammoniation at a temperature between about 350° and 800° C. in an atmosphere substantially free of aromatic hydrocarbons and comprising a partial pressure of ammonia sufficient to effect chemical combination thereof with said zeolite with resultant displacement of water therefrom.

10. A process as defined in claim 9 wherein said zeolite has a $SiO_2/Al_2O_3$ mole ratio of at least about 3.0, and wherein the zeolitic exchange capacity thereof is satisfied mainly by hydrogen ions and/or polyvalent metal ions.

11. A process as defined in claim 9 wherein said contacting process is carried out in the presence of added ammonia.

12. A process as defined in claim 9 wherein said contacting process is catalytic cracking carried out in the absence of added hydrogen, and said catalyst is a hydrogen or polyvalent metal zeolite having a $SiO_2/Al_2O_3$ mole ratio between about 3 and 12.

13. A process as defined in claim 9 wherein said contacting process is catalytic dehydrocyclization carried out in the absence of added hydrogen, and said catalyst is a Group IIA or IIB metal zeolite containing an added hydrogenating component selected from the class consisting of the Group VIB and Group VIII metals and their oxides and sulfides.

14. A process as defined in claim 9 wherein said contacting process is catalytic dehydrogenation carried out in the absence of added hydrogen, and said catalyst is a Group IIA or IIB metal zeolite containing an added hydrogenating component selected from the class consisting of the Group VIB and Group VIII metals and their oxides and sulfides.

15. A process as defined in claim 9 wherein said contacting process is catalytic reforming carried out at a hydrogen partial pressure of about 100–400 p.s.i., and said catalyst is a Group IIA or IIB metal zeolite containing an added hydrogenating component selected from the class consisting of the Group VIB and Group VIII metals and their oxides and sulfides.

16. A process as defined in claim 9 wherein said contacting process is catalytic isomerization carried out at a hydrogen partial pressure of about 100–400 p.s.i., and said catalyst is a Group IIA or IIB metal zeolite containing an added hydrogenating component selected from the class consisting of the Group VIB and Group VIII metals and their oxides and sulfides.

17. A process as defined in claim 9 wherein said contacting process is catalytic hydrocracking carried out at a hydrogen partial pressure of about 300–1000 p.s.i., and said catalyst is a hydrogen or polyvalent metal zeolite having a $SiO_2/Al_2O_3$ mole-ratio between about 3 and 12, containing an added hydrogenating component selected from the class consisting of the Group VIB and Group VIII metals and their oxides and sulfides.

18. A process as defined in claim 9 wherein said contacting process is catalytic dealkylation carried out at a hydrogen partial pressure of about 300–1000 p.s.i., and said catalyst is a Group IIA or IIB metal zeolite containing an added hydrogenating component selected from the class consisting of the Group VIB and Group VIII metals and their oxides and sulfides.

19. A process as defined in claim 9 wherein said contacting process is catalytic hydrofining carried out at a hydrogen partial pressure of about 300–1000 p.s.i., and said catalyst is a Group IIA or IIB metal zeolite containing an added hydrogenating component selected from the class consisting of the Group VIB and Group VIII metals and their oxides and sulfides.

20. A process as defined in claim 9 wherein said ammoniation is carried out at a temperature between about 450° and 700° C.

21. A process as defined in claim 9 wherein said ammoniation is carried out in the presence of water vapor.

22. A method for decreasing the coke forming tendency of a hydrocarbon conversion catalyst comprising a crystalline aluminosilicate zeolite wherein the zeolitic exchange capacity is satisfied mainly by hydrogen ions and/or polyvalent metal ions, which comprises subjecting said aluminosilicate zeolite component to ammoniation at a temperature between about 350° and 800° C. in an atmosphere substantially free of aromatic hydrocarbons and consisting essentially of at least about 0.1 p.s.i. of ammonia, with resultant displacement of water therefrom and chemical combination of at least about 0.1 weight percent of basic, nonzeolitic nitrogen therewith.

23. A method as defined in claim 22 wherein said ammoniation is carried out at a temperature between about 450° and 700° C.

24. A method as defined in claim 22 wherein said ammoniation is carried out in the presence of a minor proportion of water vapor.

* * * * *